United States Patent
Aoki et al.

(10) Patent No.: US 11,465,647 B2
(45) Date of Patent: Oct. 11, 2022

(54) VEHICLE CAPABLE OF OPERATING IN SELF-DRIVING MODE

(71) Applicant: SUBARU CORPORATION, Tokyo (JP)

(72) Inventors: Shun Aoki, Tokyo (JP); Takuya Hayashida, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 268 days.

(21) Appl. No.: 16/935,940

(22) Filed: Jul. 22, 2020

(65) Prior Publication Data

US 2021/0094579 A1    Apr. 1, 2021

(30) Foreign Application Priority Data

Sep. 27, 2019  (JP) .............................. JP2019-177880

(51) Int. Cl.
*B60Q 1/32* (2006.01)
*B60Q 1/50* (2006.01)
*B60W 60/00* (2020.01)

(52) U.S. Cl.
CPC ........... *B60W 60/0025* (2020.02); *B60Q 1/32* (2013.01); *B60Q 1/50* (2013.01); *B60Q 1/507* (2022.05); *B60Q 2300/10* (2013.01)

(58) Field of Classification Search
CPC .............................. B60Q 1/22; B60Q 1/30–32; B60Q 1/48–543; B60Q 2300/10; B60Q 2900/40; B60W 60/0025; B60W 60/005
See application file for complete search history.

(56) References Cited

U.S. PATENT DOCUMENTS

| 2017/0225567 A1 | 8/2017 | Tsuda |
| 2018/0312106 A1* | 11/2018 | Tatara ...................... B60Q 1/26 |
| 2019/0111784 A1 | 4/2019 | Tsuda |

FOREIGN PATENT DOCUMENTS

| JP | 2018-032433 A | 3/2018 |
| JP | 2019-064471 A | 4/2019 |

* cited by examiner

*Primary Examiner* — Jason M Han
(74) *Attorney, Agent, or Firm* — McDermott Will & Emery LLP

(57) ABSTRACT

A vehicle capable of operating in a self-driving mode includes a self-driving indicator lamp and a controller. The self-driving indicator lamp can turn on so as to be visually recognized from an outside of the vehicle in the self-driving mode. The controller controls a lighting state of the self-driving indicator lamp. The self-driving indicator lamp includes a right indicator lamp and a left indicator lamp respectively disposed in right and left parts of the vehicle. Lighting states of the right indicator lamp and the left indicator lamp can be controlled independently. When the vehicle starts to move in the self-driving mode from a parked or stopped state, the lighting states of the right indicator lamp and the left indicator lamp which have turned off during when the vehicle has been parked or stopped, in a manner similar to each other so as to indicate a frontward or rearward starting direction.

16 Claims, 7 Drawing Sheets

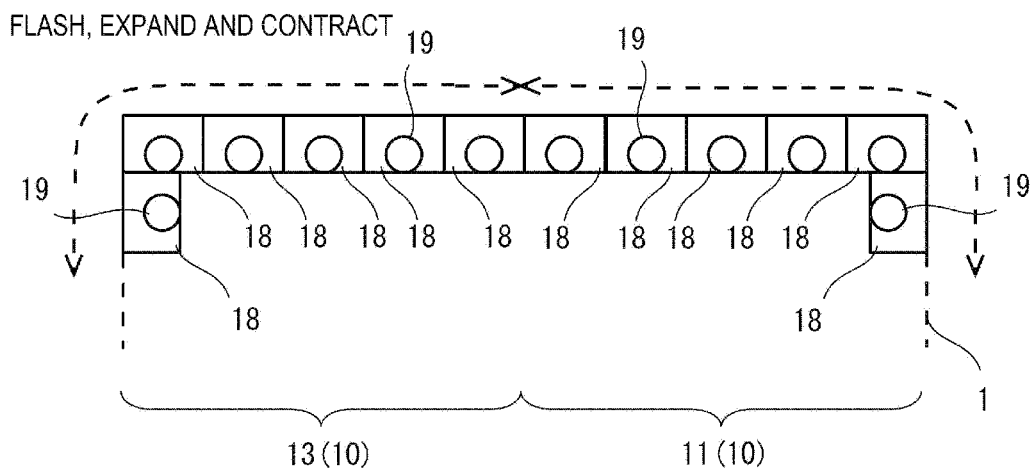

LIGHTING PATTERN TABLE 61

| STATE | LIGHTING PATTERN | | | |
| --- | --- | --- | --- | --- |
| | FRONT-LEFT INDICATOR LAMP | FRONT-RIGHT INDICATOR LAMP | REAR-LEFT INDICATOR LAMP | REAR-RIGHT INDICATOR LAMP |
| START FRONTWARD | RIGHT FLASH | LEFT FLASH | ENTIRE CONTINUOUS TURN-ON | ENTIRE CONTINUOUS TURN-ON |
| START REARWARD | ENTIRE CONTINUOUS TURN-ON | ENTIRE CONTINUOUS TURN-ON | RIGHT FLASH | LEFT FLASH |
| AUTOMATIC TRAVELING | ENTIRE CONTINUOUS TURN-ON | ENTIRE CONTINUOUS TURN-ON | ENTIRE CONTINUOUS TURN-ON | ENTIRE CONTINUOUS TURN-ON |

FIG. 8A

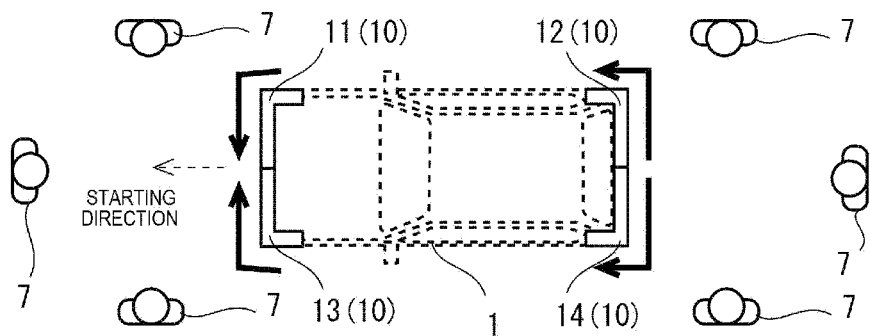

FIG. 8B

LIGHTING PATTERN TABLE 61

| STATE | LIGHTING PATTERN | | | |
|---|---|---|---|---|
| | FRONT-LEFT INDICATOR LAMP | FRONT-RIGHT INDICATOR LAMP | REAR-LEFT INDICATOR LAMP | REAR-RIGHT INDICATOR LAMP |
| START FRONTWARD | RIGHT FLASH | LEFT FLASH | LEFT FLASH/ FRONT FLASH | RIGHT FLASH/ FRONT FLASH |
| START REARWARD | LEFT FLASH/ REAR FLASH | RIGHT FLASH/ REAR FLASH | RIGHT FLASH | LEFT FLASH |
| AUTOMATIC TRAVELING | ENTIRE CONTINUOUS TURN-ON | ENTIRE CONTINUOUS TURN-ON | ENTIRE CONTINUOUS TURN-ON | ENTIRE CONTINUOUS TURN-ON |

.# VEHICLE CAPABLE OF OPERATING IN SELF-DRIVING MODE

CROSS-REFERENCE TO RELATED APPLICATIONS

The present application claims priority from Japanese Patent Application No. 2019-177880 filed on Sep. 27, 2019, the entire contents of which are hereby incorporated by reference.

BACKGROUND

The disclosure relates to a vehicle capable of operating in a self-driving mode.

As for vehicles, research and development of self-driving to automate the travel of the vehicles have been progressed.

Vehicles are expected to travel, for example, when a destination is set, to the destination by automatic control, and to be parked or stopped in the destination, in the future.

It can be considered that such a vehicle capable of operating in a self-driving mode is requested to travel to a destination by executing suitable selection of a path for traveling, confirmation of safety of a course, and danger avoid control, without causing an accident.

However, even if such control for the safe traveling is able to be executed, 100% of the safety may not be necessarily ensured. Limited safety may be ensured by the vehicle capable of operating in the self-driving mode simply executing travel control.

Therefore, ones skilled in the art has conceived, for example, that when such a vehicle is operating in the self-driving mode, a self-driving indicator lamp turns on so as to be visually recognized from the outside of the vehicle (Japanese Unexamined Patent Application Publication (JP-A) No. 2018-032433 and JP-A No. 2019-064471).

The vehicle capable of operating in the self-driving mode turns on the self-driving indicator lamp in the self-driving mode to enable an occupant of another vehicle that is present on a road or a lane on which the vehicle capable of operating in the self-driving mode is traveling and a pedestrian who is present in the surrounding to know the fact that the vehicle is operating in the self-driving mode and to prepare an action and prior measure in accordance with the fact. In this manner, in an environment in which the vehicle capable of operating in the self-driving mode is traveling, the safety may be limited if the vehicle alone is simply controlled. In order to further improve the safety, it is considered that pedestrians and vehicles other than the vehicle are to cooperate with the control.

SUMMARY

An aspect of the disclosure provides a vehicle capable of operating in a self-driving mode. The vehicle includes a self-driving indicator lamp and a controller. The self-driving indicator lamp can turn on so as to be visually recognized from an outside of the vehicle in the self-driving mode. The controller configured to control a lighting state of the self-driving indicator lamp. The self-driving indicator lamp includes a right indicator lamp and a left indicator lamp respectively disposed in a right part and a left part of the vehicle. Lighting states of the right indicator lamp and the left indicator lamp can be controlled independently. When the vehicle starts to move in the self-driving mode from a parked or stopped state, the lighting states of the right indicator lamp and the left indicator lamp which have turned off during when the vehicle has been parked or stopped, in a manner similar to each other so as to indicate a frontward or rearward starting direction.

BRIEF DESCRIPTION OF THE DRAWINGS

The accompanying drawings are included to provide a further understanding of the disclosure and are incorporated in and constitute apart of this specification. The drawings illustrate embodiments and, together with the specification, serve to explain the principles of the disclosure.

FIG. 4 is a diagram illustrating a structure of the self-driving indicator lamp in FIGS. 3A to 3D.

FIG. 5 is a diagram illustrating a lighting pattern table for the self-driving indicator lamp that is recorded in a memory in FIG. 2.

FIGS. 8A and 8B are diagrams illustrating arrangement of a self-driving indicator lamp of an automobile capable of operating in a self-driving mode, a lighting state of the self-driving indicator lamp, and a lighting pattern table, according to a second embodiment of the disclosure.

DETAILED DESCRIPTION

As for a vehicle capable of operating in a self-driving mode, when a self-driving indicator lamp turns on continuously in the self-driving mode in this manner, the self-driving indicator lamp consumes electric power. In order to reduce the electric power consumed by the self-driving indicator lamp, it may be conceived that the self-driving indicator lamp turns off when the vehicle operating in the self-driving mode is parked or stopped on a road shoulder or the like, for example.

However, such a self-driving indicator lamp turns off during when the vehicle is parked or stopped, for example, the following issues may arise.

For example, when the vehicle having turned the self-driving indicator lamp off and been parked or stopped in the self-driving mode suddenly begins starting in response to the occupant getting in, for example, pedestrians and occupants of other vehicles who are present in the surrounding thereof are surprised because the vehicle suddenly starts regardless of that they recognize the automobile is stopped. The person who is present in the surrounding is difficult to suitably correspond to the motion of the vehicle that suddenly starts. In particular, the persons who are present in the surrounding is difficult to determine the travel direction of the vehicle that intends to start in the self-driving mode, by making eye contact with a driver in the vehicle operating in the self-driving mode. When a driver who intends to operate by himself/herself and start the vehicle has been in the automobile, the driver can inform, by making eye contact with a pedestrian who intends to cross a place in front of the vehicle during checking of the surroundings before start, for example, the person who is present in the starting direction that the driver intends to start the vehicle. However, such an occupant is highly likely to be absent in the vehicle that starts in the self-driving mode.

As in the foregoing, it is desirable that when starting from the parked or stopped state while reducing electric power consumed by the self-driving indicator lamp, the vehicle capable of operating in the self-driving mode suitably informs the person who is present in the surrounding of the vehicle.

Hereinafter, embodiments of the disclosure will be described with reference to the accompanying drawings.

First Embodiment

Figure 1A:
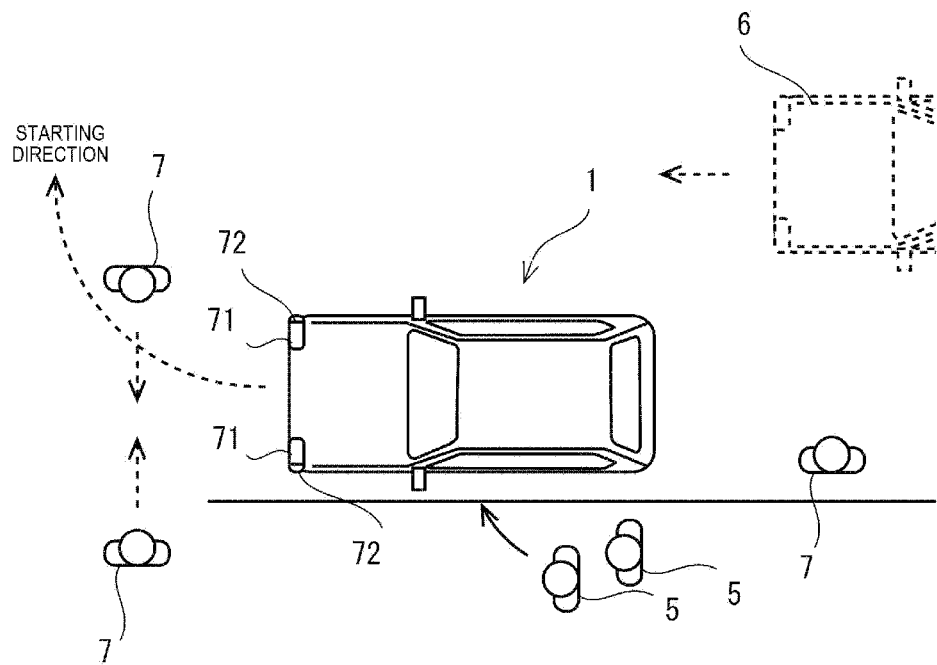
FIGS. 1A and 1B are diagrams illustrating an automobile capable of operating in a self-driving mode according to a first embodiment of the disclosure.
Figure 1B:
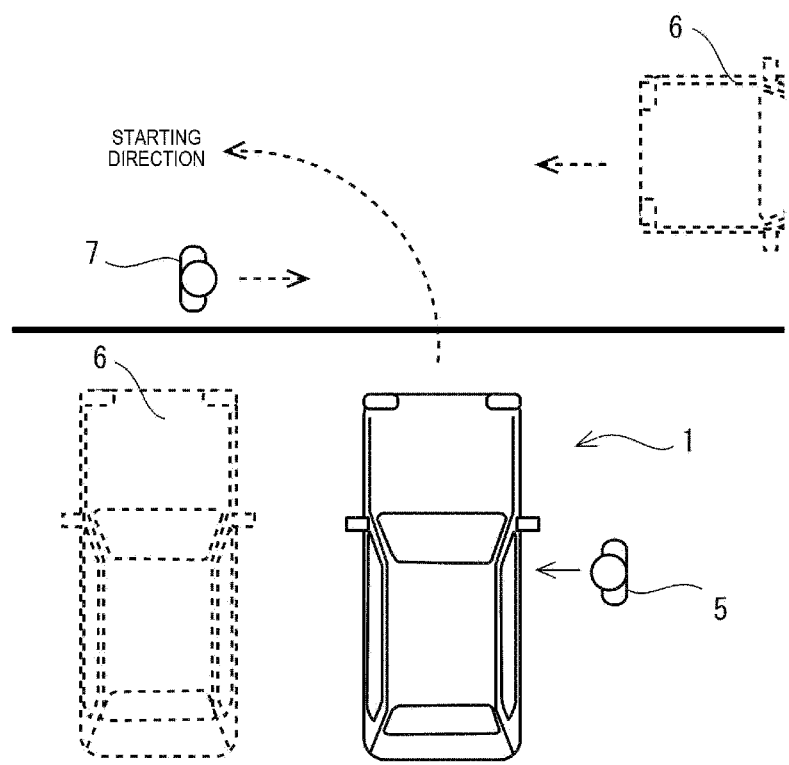

FIGS. 1A and 1B are diagrams illustrating an automobile 1 capable of operating in a self-driving mode according to a first embodiment of the disclosure.

FIGS. 1A and 1B illustrate the automobile 1 that can travel by switching between a self-driving mode and a manual driving mode.

In FIG. 1A, the automobile 1 is parked or stopped near a road shoulder on a roadway in order to wait for occupants 5 to get in the automobile 1, for example. Another automobile 6 is traveling on the roadway. Moreover, in the surrounding of the automobile 1, a pedestrian 7 who moves on the road shoulder and pedestrians 7 who move across the roadway are present. For example, when the occupants 5 get in the automobile 1 capable of operating in the self-driving mode, the automobile 1 starts toward the roadway, joins the roadway, and travels in the self-driving mode on the roadway to a destination of the occupants 5.

In FIG. 1B, the automobile 1 is parked or stopped in a parking space of a parking lot at a side of the roadway, for example. Another automobile 6 is parked or stopped in the parking space. Another automobile 6 is traveling on the roadway. Moreover, in the surrounding of the automobile 1, a pedestrian 7 who moves on the road is present. For example, when the occupants 5 get in the automobile 1 capable of operating in the self-driving mode, the automobile 1 starts toward the roadway from the parking space and travels in the self-driving mode on the roadway to a destination of the occupant 5.

It can be considered that such an automobile 1 capable of operating in the self-driving mode is to travel to a destination by appropriately selecting a path for traveling, checking safety of a course, and executing danger avoid control, without causing an accident.

However, even if such control for the safe traveling has been able to be executed, 100% of the safety may not be necessarily ensured. Limited safety may be ensured by the automobile 1 capable of operating in the self-driving mode simply executing the travel control.

Therefore, it may be conceived that when such an automobile 1 capable of operating in the self-driving mode is operating in the self-driving mode, for example, a self-driving indicator lamp 10 turns on so as to be visually recognized from an outside of the automobile 1.

The automobile 1 capable of operating in the self-driving mode turns on the self-driving indicator lamp 10 in the operation mode to enable a person who is present in the surrounding of the automobile 1 which is operating in the self-driving mode to know that the automobile 1 is traveling in the self-driving mode. The person who is present in the surrounding can cope with the motion of the automobile 1 that is traveling in the self-driving mode.

However, when such a self-driving indicator lamp 10 is on continuously in the self-driving mode, electric power available for the automobile 1 capable of operating in the self-driving mode is continuously consumed by the self-driving indicator lamp 10 being on. Therefore, it may be conceived that the self-driving indicator lamp 10 turns off when the automobile 1 which is operating in the self-driving mode is parked or stopped on a road shoulder or the like, for example. However, if such a self-driving indicator lamp 10 turns off during when the automobile is parked or stopped, for example, the following issue may arise instead.

For example, when the automobile 1 having turns the self-driving indicator lamp 10 off and having been parked or stopped suddenly begins starting in the self-driving mode in response to the occupant 5 getting in, for example, the pedestrians 7 and an occupant of the other automobile 6 who are present in the surrounding thereof are surprised because the automobile 1 suddenly starts regardless of that they recognize the automobile 1 as being stopped. The person who is present in the surrounding is difficult to suitably correspond to the motion of the automobile 1 that suddenly starts. In particular, the person who is present in the surrounding is difficult to determine the travel direction of the automobile 1 that intends to start in the self-driving mode, by making eye contact with a driver who is in the automobile 1. When a driver who intends to operate by himself/herself and start the automobile 1 has been in the automobile 1, the driver can inform, by making eye contact with the pedestrian 7 who intends to cross a place in front of the automobile 1 during checking of the surroundings before the start, for example, the person who is present in the starting direction that the driver intends to start the automobile 1. However, such an occupant 5 is highly likely to be absent in the automobile 1 that starts in the self-driving mode.

In particular, when starting from the parked or stopped state, the automobile 1 capable of operating in the self-driving mode is to inform a movable body such as a person who is present in the surrounding of the automobile 1 that the automobile 1 is about to start from the parked or stopped state.

Figure 2:
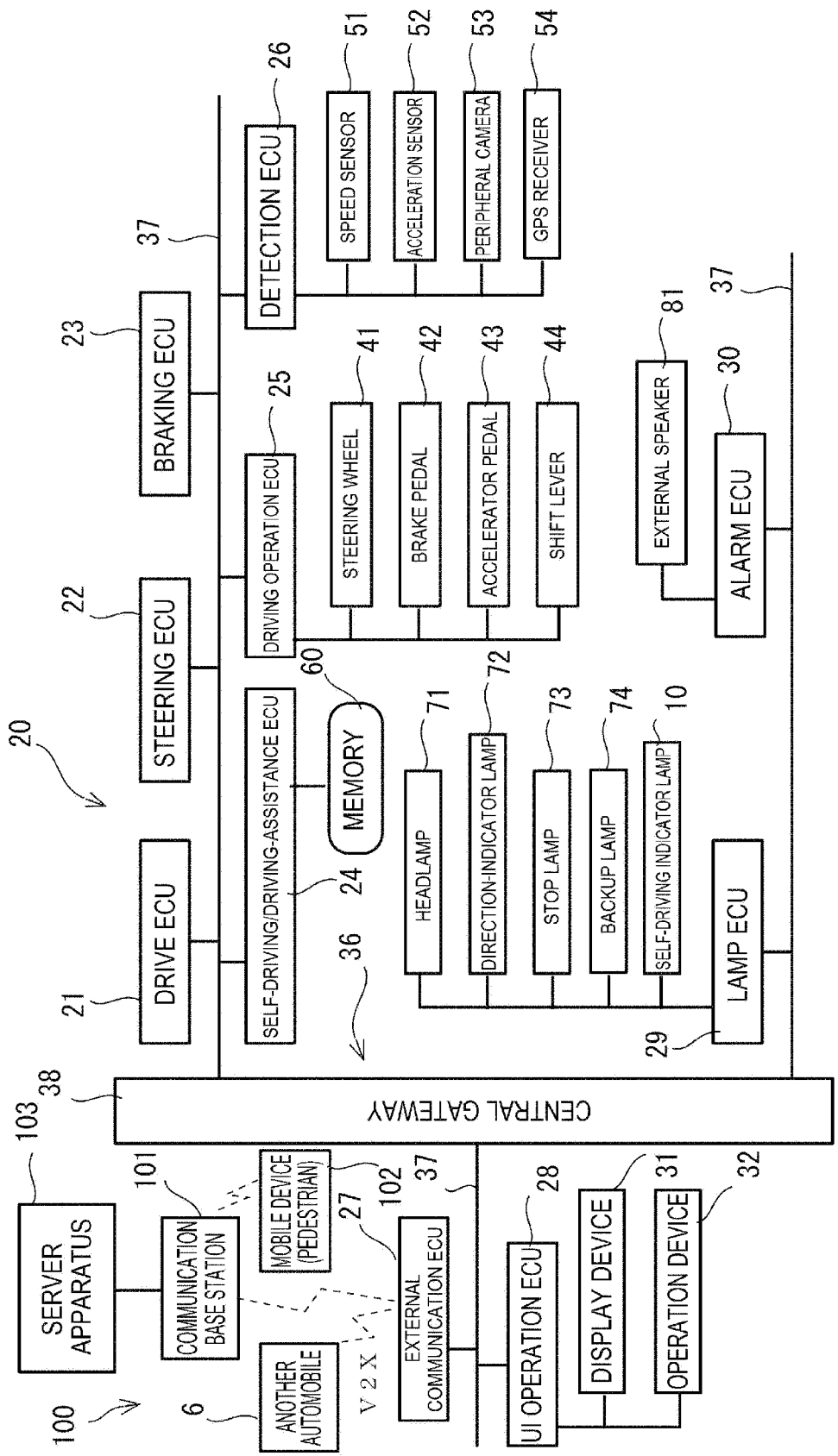
FIG. 2 is a diagram illustrating a control system of the automobile in FIGS. 1A and 1B.

FIG. 2 is a diagram illustrating a control system 20 of the automobile 1 in FIGS. 1A and 1B. In FIG. 2, control electronic control units (ECUs) are representatively illustrated, which are respectively incorporated into a plurality of control devices that constitute the control system 20 of the automobile 1. The control device may include, in addition to the control ECU, for example, a storage member that records a control program and data, input and output ports that are coupled to a control target object or a state detection device thereof, a timer that measures time and a time-of-day, and an internal bus to which these are coupled.

The control ECUs illustrated in FIG. 2 are, for example, a drive ECU 21, a steering ECU 22, a braking ECU 23, a self-driving/driving-assistance ECU 24, a driving operation ECU 25, a detection ECU 26, an external communication ECU 27, a UI operation ECU 28, a lamp ECU 29, and an alarm. ECU 30. The control system 20 of the automobile 1 may include another control ECU, which is not illustrated.

The plurality of control ECUs are coupled to a vehicle network 36, such as a controller area network (CAN) and a local interconnect network (LIN), that is employed in the automobile 1. The vehicle network 36 may be configured with a plurality of bus cables 37 to which the plurality of control ECUs can be coupled, and a central gateway (CGW) 38 serving as a relay device to which the plurality of bus cables 37 are coupled. Mutually different IDs, each serving as identification information, are respectively allocated to the plurality of control ECUs. Each control ECU basically and cyclically outputs notification data to another control ECU. An ID of the control ECU as an output source and an ID of the control ECU as an output destination are added to the notification data. The other control ECU monitors the bus cable 37, and acquires notification data when the ID of the output destination is the own ID, for example, and executes processing based on the notification data. The central gateway 38 monitors each of the plurality of bus cables 37 being coupled thereto, and outputs notification data, when detecting a control ECU that is coupled to another bus cable 37 different from that of a control ECU as an output source, to the other bus cable 37. Such relay processing by the central gateway 38 enables the plurality of control ECUs to input and output notification data to and from the other control ECU that is coupled to the other bus cable 37 different from the bus cable 37 to which each control ECU is coupled.

The external communication ECU 27 performs wireless communication with a communication base station 101 that is present in the outside of the automobile 1 and a communication apparatus of the other automobile 6, for example. The communication base station 101 may be, for example, a base station in a communication network such as an advanced driver assistance system (ADAS) or may be a base station in a carrier communication network. A base station in the carrier communication network may communicate with not only the communication apparatus of the other automobile 6, but also a mobile device 102 that is held by the occupant 5. The plural external communication ECUs 27 may be provided in the automobile 1 in a divided manner in accordance with the types of counterparts to be directly communicated. Further, the communication base station 101, the communication apparatus of the other automobile 6, and the mobile device 102 constitute a traffic system 100 together with a server apparatus 103. The external communication ECU 27 performs direct wireless communication with the communication base station 101 or the communication apparatus of the other automobile 6, thereby transmitting and receiving communication data to and from the server apparatus 103, the other automobile 6, or the mobile device 102.

A display device 31 and an operation device 32 (serving as user interface devices with the occupant 5, for example) are coupled to the UI operation ECU 28. The display device 31 may be, for example, a liquid crystal device or a video projection device. The operation device 32 may be, for example, a touch panel, a keyboard, or a noncontact operation detection device. The display device 31 and the operation device 32 may be disposed, for example, to an inner surface of a vehicle cabin in which the occupant 5 is. The UI operation ECU 28 acquires notification data from the vehicle network 36, and displays the notification data on the display device 31. The UI operation ECU 28 outputs an operation input with respect to the operation device 32 to the vehicle network 36. Moreover, the UI operation ECU 28 may execute processing based on the operation input, and include a processing result thereof in the notification data. The UI operation ECU 28 may display, for example, a navigation screen for setting a destination or the like on the display device 31, search for a path to the destination selected by the operation input, and include the path data in the notification data. The path data may include attribute information on a lane of a road that is used in movement from a current location to a destination, for example.

To the driving operation ECU 25, for example, a steering wheel 41, a brake pedal 42, an accelerator pedal 43, a shift lever 44, and the like are coupled as operation members in order that the occupant 5 controls the traveling of the automobile 1. When the operation member is operated, the driving operation ECU 25 outputs notification data including the presence or absence of the operation, the operation amount, and the like, to the vehicle network 36. Moreover, the driving operation ECU 25 may execute processing on the operation with respect to the operation member, and include a processing result thereof in the notification data. When the accelerator pedal 43 is operated in a status where another movable body or a fixed object is present in the travel direction of the automobile 1, for example, the driving operation ECU 25 may determine the abnormality operation, and include a determination result thereof in the notification data.

To the detection ECU 26, as detection members for detecting a traveling state of the automobile 1, for example, a speed sensor 51 that detects the speed of the automobile 1, an acceleration sensor 52 that detects the acceleration of the automobile 1, a peripheral camera 53 that captures an image of an external surrounding of the automobile 1, such as a stereo camera or a 360-degree camera, a GPS receiver 54 that detects a position of the automobile 1, and the like are coupled. The detection ECU 26 acquires detection information from the detection member, and outputs notification data including the detection information, to the vehicle network 36. Moreover, the detection ECU 26 may execute processing based on the detection information, and include a processing result thereof in the notification data. For example, when the acceleration sensor 52 has detected the acceleration that exceeds a collision detection threshold, the detection ECU 26 may determine the collision detection, and may include a collision detection result in the notification data. The detection ECU 26 may extract a movable body such as the pedestrian 7 or the other automobile 6 that is present in the surrounding of the host vehicle based on the image by the peripheral camera 53, determine a type and an attribute of the movable body, estimate a relative direction, a relative distance, and a movement direction of the movable body in accordance with the position, the size, and the change of the movable body in the image, include information on the movable body including these estimation results in notification data, and output the notification data to the vehicle network 36.

A memory 60 is coupled to the self-driving/driving-assistance ECU 24. A program, a setting value, and the like are recorded in the memory 60. The self-driving/driving-assistance ECU 24 reads a program from the memory 60, and executes the program. In one embodiment, the self-driving/driving-assistance ECU 24 may serve as a "controller".

For example, the self-driving/driving-assistance ECU 24 acquires notification data from the vehicle network 36, and switches the traveling of the automobile 1 between a self-driving mode and a manual driving mode.

Moreover, the self-driving/driving-assistance ECU 24 acquires notification data from the vehicle network 36, executes control for enabling the automobile 1 to operate in the self-driving mode or assist driving of the automobile 1, generates travel control data, and outputs the travel control data to the drive ECU 21, the steering ECU 22, and the braking ECU 23. The drive ECU 21, the steering ECU 22, and the braking ECU 23 control the traveling of the automobile 1 based on the input travel control data.

When the automobile 1 operates in the self-driving mode, the self-driving/driving-assistance ECU 24 (serving as the travel controller) acquires notification data from the vehicle network 36, and searches for or acquires a path to a destination. The self-driving/driving-assistance ECU 24 acquires notification data from the vehicle network 36, determines whether the automobile 1 has abnormality or danger, generates travel control data on a course that is moved along the path when the automobile 1 has neither abnormality nor danger, outputs the travel control data as notification data. The self-driving/driving-assistance ECU 24 controls the traveling of the automobile 1 until the automobile 1 stops in a parking lot or the like in the destination, such that the automobile 1 travels along a movement path to when reaching the destination, based on position information on the host vehicle by the GPS receiver 54 or the like. When the automobile 1 has abnormality or danger, the self-driving/driving-assistance ECU 24 generates travel control data so as to avoid the abnormality or the danger, and outputs the travel control data as notification data.

When assisting the driving of the automobile 1, the self-driving/driving-assistance ECU 24 acquires notification data on an operation input via the vehicle network 36 from the UI operation ECU 28, generates travel control data in which an operation by the operation input is adjusted, and outputs the travel control data as notification data. The self-driving/driving-assistance ECU 24 controls the traveling of the automobile 1 in response to the driving operation by the occupant 5. When the automobile 1 has abnormality or danger, the self-driving/driving-assistance ECU 24 generates travel control data so as to avoid the abnormality or the danger, and outputs the travel control data as notification data.

To the lamp ECU 29, headlamps 71 that are provided in the front part of the automobile 1, direction-indicator lamps 72 serving as direction indicators that are provided in the front, rear, left and right parts of the automobile 1, stop lamps 73 that are provided in the rear part of the automobile 1, backup lamps 74 serving as reversing lamps that are provided in the rear part of the automobile 1, and the self-driving indicator lamp 10 are coupled. The headlamps 71, the direction-indicator lamps 72, the stop lamps 73, and the backup lamps 74 are other lamps that are provided in the automobile 1, separately from the self-driving indicator lamp 10.

The lamp ECU 29 acquires notification data for controlling the lamps from the vehicle network 36, and controls lighting states of the headlamps 71, the direction-indicator lamps 72, the stop lamps 73, the backup lamps 74, and the self-driving indicator lamp in accordance with the notification data. When the self-driving/driving-assistance ECU 24 controls the traveling of the automobile 1 in the self-driving mode, for example, the lamp ECU 29 turns on the self-driving indicator lamp 10 based on an instruction from the self-driving/driving-assistance ECU 24 such that the self-driving indicator lamp 10 is visually recognized from the outside of the automobile 1 in the self-driving mode. Accordingly, for example, a person who is present in the surrounding of the automobile 1 can know that the automobile 1 is operating in the self-driving mode by visually recognizing the self-driving indicator lamp 10 being on. Moreover, the person can cope with the traveling of the automobile 1 which is operating in the self-driving mode.

An external speaker 81 is coupled to the alarm ECU 30. The alarm ECU 30 acquires notification data on alarm output from the vehicle network 36, and outputs alarm sound from the external speaker 81 in accordance with the notification data.

FIGS. 3A to 3D are diagrams illustrating arrangement of the self-driving indicator lamp 10 in the automobile 1 of FIGS. 1A and 1B.

Figure 3A:
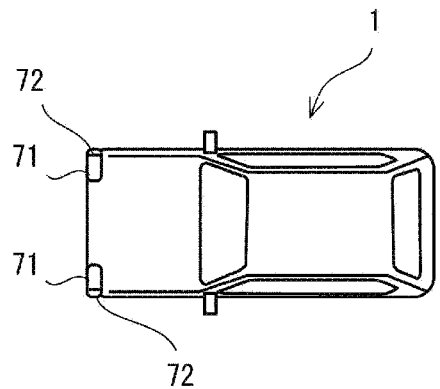
FIGS. 3A to 3D are diagrams illustrating arrangement of a self-driving indicator lamp in the automobile in FIGS. 1A and 1B.
Figure 3B:
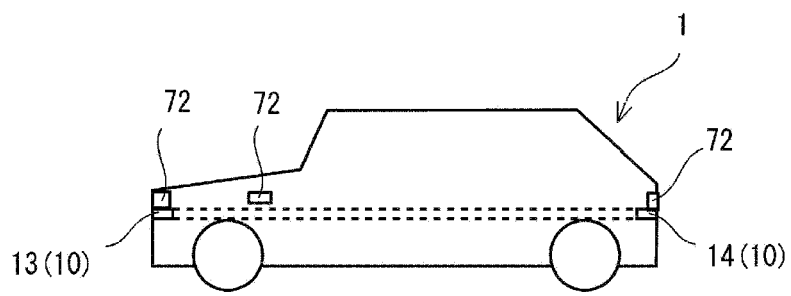
Figure 3C:
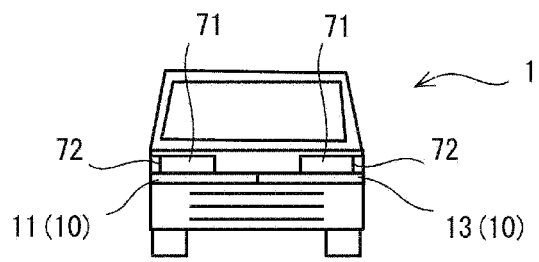
Figure 3D:
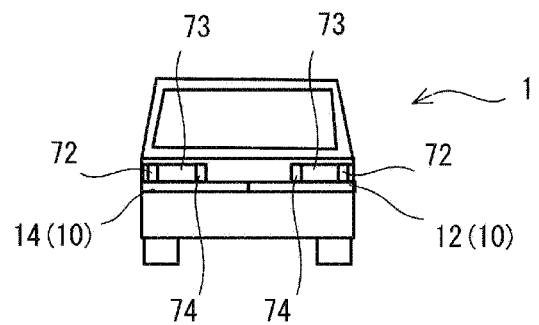

FIG. 3A is a plan view of the automobile 1 of FIGS. 1A and 1B. FIG. 3B is a left side view of the automobile 1. FIG. 3C is a front side view of the automobile 1. FIG. 3D is a rear side view of the automobile 1.

The automobile 1 in FIGS. 3A to 3D includes, as the self-driving indicator lamp 10, a front-right indicator lamp 11, a rear-right indicator lamp 12, a front-left indicator lamp 13, and a rear-left indicator lamp 14. The front-right indicator lamp 11 and the rear-right indicator lamp 12 are right indicator lamps that are provided at the right side from the center of the automobile 1. The front-left indicator lamp 13 and the rear-left indicator lamp 14 are left indicator lamps that are provided at the left side from the center of the automobile 1. The front-right indicator lamp 11, the rear-right indicator lamp 12, the front-left indicator lamp 13, the rear-left indicator lamp 14 that constitute the self-driving indicator lamp 10 may be capable of turning on in the same color, for example, turquoise blue.

The front-right indicator lamp 11 is provided at a front-right corner on an outer peripheral surface in the lower part of the automobile 1. The front-left indicator lamp 13 is provided at a front-left corner on the outer peripheral surface in the lower part of the automobile 1. The front-right indicator lamp 11 and the front-left indicator lamp 13 are adjacent to each other at the center on a front surface of the automobile 1. The headlamp 71 and the direction-indicator lamp 72 are disposed so as to be adjacent to each other on each of the front-right indicator lamp 11 and the front-left indicator lamp 13.

The rear-right indicator lamp 12 is provided at a rear-right corner on the outer peripheral surface in the lower part of the automobile 1. The rear-left indicator lamp 14 is provided at a rear-left corner on the outer peripheral surface in the lower part of the automobile 1. The rear-right indicator lamp 12 and the rear-left indicator lamp 14 are adjacent to each other at the center on a rear surface of the automobile 1. The backup lamp 74, the stop lamp 73, and the direction-indicator lamp 72 are disposed so as to be adjacent to each other on each of the rear-right indicator lamp 12 and the rear-left indicator lamp 14.

The plurality of indicator lamps 11 to 14 that constitute the self-driving indicator lamp 10 are provided along the outer peripheral surface in the lower part of the automobile 1. The self-driving indicator lamp 10 is provided in the automobile 1 capable of traveling in the self-driving mode so as to be visually recognized from an approximate whole circumference outside the automobile 1.

Further, lighting states of the front-right indicator lamp 11, the rear-right indicator lamp 12, the front-left indicator lamp 13, and the rear-left indicator lamp 14 can be controlled independently.

The front-right indicator lamp 11 and the rear-right indicator lamp 12 may be adjacent to each other at the center on aright side surface of the automobile 1. The front-left indicator lamp 13 and the rear-left indicator lamp 14 may be adjacent to each other at the center on a left side surface of the automobile 1.

FIG. 4 is a diagram illustrating a structure of the self-driving indicator lamp 10 in FIGS. 3A to 3D.

FIG. 4 illustrates the front-right indicator lamp 11 and the front-left indicator lamp 13. It is noted that both of the rear-right indicator lamp 12 and the rear-left indicator lamp 14 have the similar structure.

The front-right indicator lamp 11 has a structure in which a plurality of light emitting units 18 are arranged along an extending direction on the front surface of the automobile 1. The plurality of light emitting units 18 in the front-right indicator lamp 11 are arranged in a row from the front-right corner of the automobile 1 to the center thereof, and aligned along a vehicle width direction that is a horizontal direction of the automobile 1.

The front-left indicator lamp 13 has a structure in which a plurality of light emitting units 18 are arranged along the extending direction on the front surface of the automobile 1. The plurality of light emitting units 18 in the front-left indicator lamp 13 are arranged in a row from the front-left corner of the automobile 1 to the center thereof, and aligned along the vehicle width direction of the automobile 1.

Each light emitting unit 18 includes, for example, a light emitting element 19 such as LED. In addition, for example, each light emitting unit 18 may include a light guide path that guides light from a common light source.

The front-right indicator lamp 11, the front-left indicator lamp 13, the rear-right indicator lamp 12, and the rear-left indicator lamp 14, each of which includes the plurality of light emitting units 18 being aligned along the vehicle width direction can be controlled to turn on independently in units of the light emitting units 18. The light emitting units 18 can be controlled to turn on and turn off in units of lighting zones that are defined in accordance with the width of the light emitting units 18. For example, the light emitting units 18 at both left and right sides of the automobile 1 can turn on in sequence or can turn off in sequence toward the light emitting unit 18 at the center thereof, or the light emitting units 18 at both left and right sides can turn on or turn off in sequence toward the light emitting unit 18 at the center thereof. This enables the indicator lamps 11 to 14 to flash such that the light emitting unit 18 turning on or turning off flows, or such that an indication range varies in long and short lengths in the vehicle width direction.

In addition to this, for example, each indicator lamp may be provided with a light source that extends along the indicator lamp, and a plurality of shutters that can be operated for lighting zones, respectively. Also in this case, opening and closing of the plurality of shutters can be controlled for the lighting zones.

FIG. 5 is a diagram illustrating a lighting pattern table 61 for the self-driving indicator lamp 10 that is recorded in the memory 60 in FIG. 2.

The respective lighting states of the front-right indicator lamp 11, the rear-right indicator lamp 12, the front-left indicator lamp 13, and the rear-left indicator lamp 14 are controlled in accordance with the lighting pattern table 61.

The lighting pattern table 61 in FIG. 5 includes data on a plurality of lighting patterns for every row. Data on each lighting pattern is selected in accordance with a traveling state when the automobile 1 travels in the self-driving mode, and is used for controlling the self-driving indicator lamp 10 to turn on and turn off.

Data on the lighting pattern at a first row in FIG. 5 is used when the automobile 1 starts frontward in the self-driving mode. When the automobile 1 starts frontward in the self-driving mode, the front-left indicator lamp 13 is controlled to be in a right flash state in which the light emitting units 18 turn on from the light emitting unit 18 at the left end to the light emitting unit 18 at the right end in sequence. The front-right indicator lamp 11 is controlled to be in a left flash state in which the light emitting units 18 turn on from the light emitting unit 18 at the right end to the light emitting unit 18 at the left end in sequence. The rear-left indicator lamp 14 is controlled to be in an entire continuous turn-on state in which all the light emitting units 18 continuously turn on. The rear-right indicator lamp 12 is controlled to be in the entire continuous turn-on state in which all the light emitting units 18 continuously turn on.

Data on the lighting pattern at a second row in FIG. 5 is used when the automobile 1 starts rearward in the self-driving mode. When the automobile 1 starts rearward in the self-driving mode, the front-left indicator lamp 13 is controlled to be in the entire continuous turn-on state in which all the light emitting units 18 continuously turn on. The front-right indicator lamp 11 is controlled to be in the entire continuous turn-on state in which all the light emitting units 18 continuously turn on. The rear-left indicator lamp 14 is controlled to be in the right flash state in which the light emitting units 18 turn on from the light emitting unit 18 at the left end to the light emitting unit 18 at the right end in sequence. The rear-right indicator lamp 12 is controlled to be in the left flash state in which the light emitting units 18 turn on from the light emitting unit 18 at the right end to the light emitting unit 18 at the left end in sequence.

In this manner, the lighting pattern table 61 in FIG. 5 includes a plurality of lighting patterns with respect to a plurality of starting directions. The lighting pattern table 61 in FIG. 5 includes the two lighting patterns in frontward and rearward starting directions. The plurality of lighting patterns for the respective starting directions are selected and used in an automatic starting mode in which the automobile 1 being parked or stopped starts. As for the two lighting patterns for the frontward and rearward starting directions, when the automobile 1 starts in the self-driving mode from the parked or stopped state, the lighting states of the plurality of indicator lamps 11 to 14 (serving as the self-driving indicator lamp 10) which have turned off during when the automobile 1 has been parked or stopped are changed symmetrically about the center of the automobile 1 in the automobile width direction so as to indicate a frontward or rearward direction in which the automobile 1 starts.

Moreover, data in the lighting pattern at a third row in FIG. 5 is used in an automatic path traveling mode in which the automobile 1 has started and travels in accordance with the path. When the automobile 1 travels in accordance with the path, all the front-right indicator lamp 11, the rear-right indicator lamp 12, the front-left indicator lamp 13, and the rear-left indicator lamp 14 are controlled to be in the entire continuous turn-on state in which all the light emitting units 18 continuously turn on.

Figure 6:
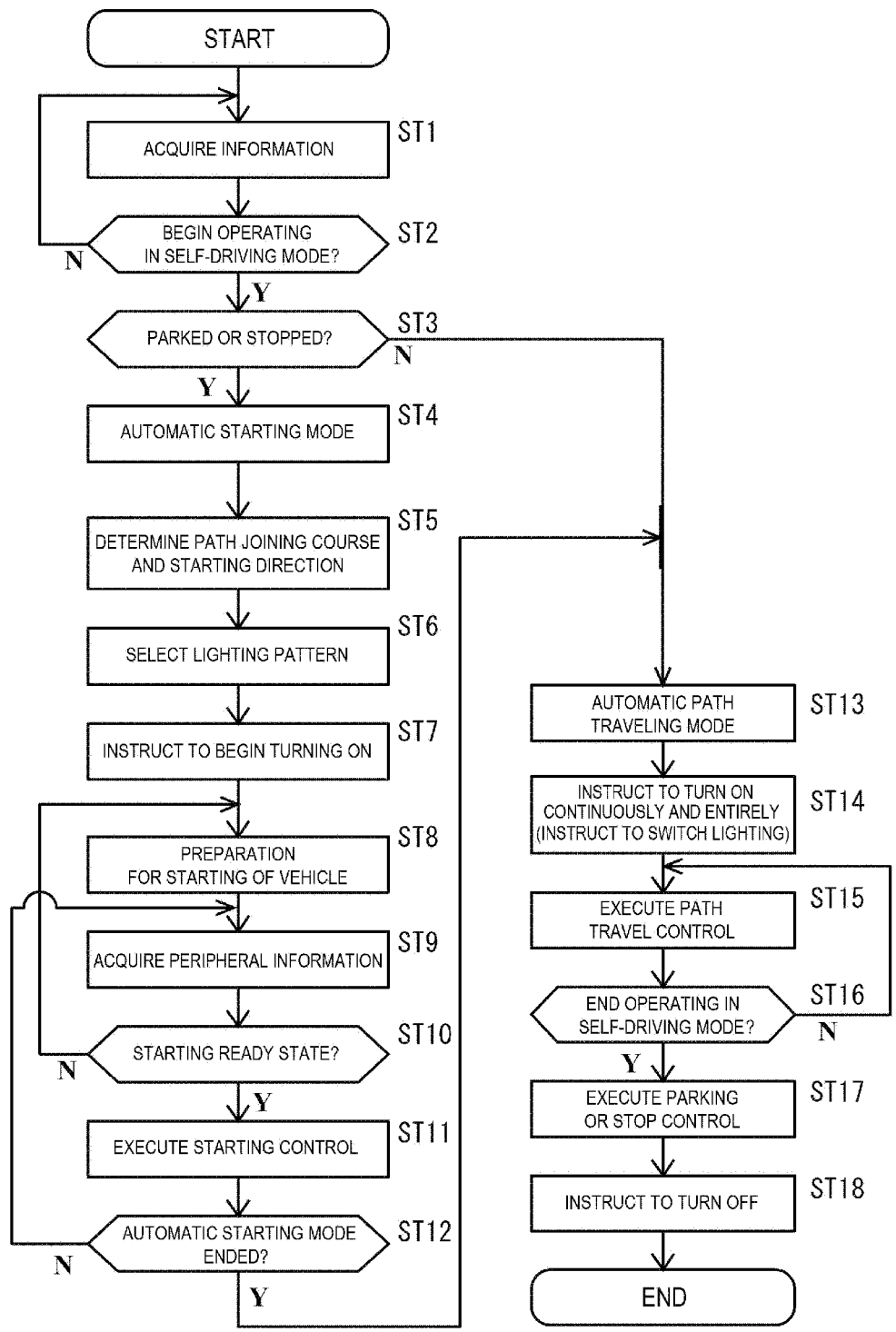
FIG. 6 is a flowchart of control of the automobile in the self-driving mode executed by a self-driving/driving-assist ECU in FIG. 2.

FIG. 6 is a flowchart of control of the automobile 1 in the self-driving mode executed by the self-driving/driving-assistance ECU 24 in FIG. 2.

The self-driving/driving-assistance ECU 24 repeatedly executes the processing in FIG. 6. In one embodiment, the self-driving/driving-assistance ECU 24 may serve as a "controller" of the automobile 1 capable of operating in the self-driving mode.

The self-driving/driving-assistance ECU 24 executes the processing in FIG. 6 to control the automobile 1 capable of operating in the self-driving mode to operate in the self-driving mode, and to control the lighting state of the self-driving indicator lamp 10.

At a step ST1, the self-driving/driving-assistance ECU 24 acquires information to be used for control from the control ECUs in the respective elements of the automobile 1 illustrated in FIG. 2 via the vehicle network 36.

At a step ST2, the self-driving/driving-assistance ECU 24 determines whether the automobile 1 begins operating in the self-driving mode. The self-driving/driving-assistance ECU 24 determines whether the automobile 1 is set to traveling in the self-driving mode, for example. The self-driving/driving-assistance ECU 24 determines that the automobile 1 is set to traveling in the self-driving mode, for example, when having acquired data on the self-driving set by a user from the UI operation ECU 28. Moreover, the self-driving/driving-assistance ECU 24 may determine whether the automobile 1 is capable of starting in the self-driving mode or is in a starting-ready state. The self-driving/driving-assistance ECU 24 may determine that the occupant 5 has been in the automobile 1, for example, based on detecting that the occupant 5 is in the automobile 1 by a wearing sensor of a seatbelt, an in-vehicle camera, and an opening/closing sensor of a door, which are not illustrated. When the UI operation ECU 28 has acquired a destination and a path in the self-driving mode, the self-driving/driving-assistance ECU 24 may determine that the automobile 1 is in the starting-ready state. Moreover, the self-driving/driving-assistance ECU 24 may determine that the automobile 1 is in the starting-ready state, based on an operation of a traveling start button, which is not illustrated, of the UI operation ECU 28. In addition to these, for example, the self-driving/driving-assistance ECU 24 may determine whether the automobile 1 is in a state where the automobile 1 can travel in the self-driving mode, for example, based on the remained power of a driving battery, which is not illustrated. If the automobile 1 is requested to begin traveling in the self-driving mode and the determination results show that the automobile 1 can travel in the self-driving mode, the self-driving/driving-assistance ECU determines that the automobile 1 begins travel in the self-driving mode, and causes the processing to proceed to a step ST3. If any one of determination results does not suit for beginning the traveling in the self-driving mode, the self-driving/driving-assistance ECU 24 repeats this determination processing until all the determination results suit for beginning the traveling in the self-driving mode.

At the step ST3, the self-driving/driving-assistance ECU 24 determines whether the automobile 1 is parked or stopped. If the automobile 1 has already begun traveling in the self-driving mode at the processing timing at the step ST3, the self-driving/driving-assistance ECU 24 determines that the automobile 1 is not parked or stopped, and causes the processing to proceed to a step ST13. If the automobile 1 is parked or stopped, that is, does not begin the traveling in the self-driving mode, the self-driving/driving-assistance ECU 24 determines that the automobile 1 is parked or stopped, and causes the processing to proceed to a step ST4.

At the step ST4, the self-driving/driving-assistance ECU 24 begins controlling the automobile 1 in the automatic starting mode.

At a step ST5, the self-driving/driving-assistance ECU 24 generates a course for joining a path on which the automobile 1 travels in the self-driving mode. For example, the self-driving/driving-assistance ECU 24 acquires a current position from the GPS receiver 54. The self-driving/driving-assistance ECU 24 acquires information on a path on which the automobile 1 travels in the self-driving mode, from the UI operation ECU 28 or the external communication ECU 27. The self-driving/driving-assistance ECU 24 generates a path joining course for joining the path from the current position, for example, for traveling from the current position to a start point on the path. The self-driving/driving-assistance ECU 24 may instruct the UI operation ECU 28 or the external communication ECU 27 to execute these processing. When generating a path joining course, the self-driving/driving-assistance ECU 24 determines a starting direction for starting the traveling along the course.

At a step ST6, the self-driving/driving-assistance ECU 24 selects one lighting pattern from the lighting pattern table 61 in FIG. 5 recorded in the memory 60, using the starting course in the self-driving mode determined at the step ST5. For example, when the automobile 1 being parked or stopped starts frontward in the self-driving mode, the self-driving/driving-assistance ECU 24 selects the lighting pattern at the first row in FIG. 5. When the automobile 1 being parked or stopped starts rearward in the self-driving mode, the self-driving/driving-assistance ECU 24 selects the lighting pattern at the second row in FIG. 5. The lighting pattern at the first row and the lighting pattern at the second row are lighting patterns in the lighting state different from the lighting pattern at the third row during automatic traveling. When the automobile 1 begins traveling in the self-driving mode, the self-driving/driving-assistance ECU 24 selects one lighting pattern from the memory 60 based on the starting direction in the self-driving mode.

At a step ST7, the self-driving/driving-assistance ECU 24 outputs an instruction of turning on the self-driving indicator lamps 10 based on the selected lighting pattern, to the lamp ECU 29 via the vehicle network 36. Accordingly, the lamp ECU 29 controls the lighting states of the front-right indicator lamp 11, the rear-right indicator lamp 12, the front-left indicator lamp 13, and the rear-left indicator lamp 14 (serving as the self-driving indicator lamp 10), in accordance with the lighting pattern table 61. The front-right indicator lamp 11, the rear-right indicator lamp 12, the front-left indicator lamp 13, and the rear-left indicator lamp 14 begin turning on based on the selected lighting pattern.

At a step ST8, the self-driving/driving-assistance ECU 24 executes starting preparing processing of the automobile 1. The self-driving/driving-assistance ECU 24 starts the control ECUs such as the drive ECU 21, the steering ECU 22, and the braking ECU 23, which are used for the traveling of the automobile 1, and begins power feeding to not-illustrated respective elements, such as a drive motor and a transmission, that are controlled by the drive ECU 21, the steering ECU 22, and the braking ECU 23 and used for the traveling of the automobile 1. The self-driving/driving-assistance ECU 24 switches setting of the respective elements of the automobile 1, for example, setting of a transmission gear, to setting for beginning the traveling in the self-driving mode. Accordingly, the automobile 1 enters a state in which the automobile 1 can begin the traveling in the self-driving mode.

At a step ST9, the self-driving/driving-assistance ECU 24 acquires information on the surroundings of the automobile 1 being parked or stopped. The self-driving/driving-assistance ECU 24 acquires a peripheral image of the automobile 1 being parked or stopped by the peripheral camera 53, and information on a peripheral movable body recognized based on the image, for example. Examples of the peripheral movable body includes a person who walks near the automobile 1, and the other automobile 6 that travels on a roadway near the automobile 1.

At a step ST10, the self-driving/driving-assistance ECU 24 determines whether the automobile 1 is in a starting ready state, that is, is ready to start under control in the self-driving mode. For example, if the starting preparing processing of the automobile 1 at the step ST8 is completed and it is predicted that the automobile 1 starting on a path join course does not overlap with a course of a movable body that is present in the surrounding of the automobile 1, the self-driving/driving-assistance ECU 24 determines that the automobile 1 is in the starting ready state, and causes the processing to proceed to a step ST11. If the automobile 1 is not in the starting ready state, the self-driving/driving-assistance ECU 24 returns the processing to the step ST8. The self-driving/driving-assistance ECU 24 repeats the processing from the step ST8 to the step ST10 until the self-driving/driving-assistance ECU 24 determines that the automobile 1 is in the starting ready state. During the processing, the front-right indicator lamp 11, the rear-right indicator lamp 12, the front-left indicator lamp 13, and the rear-left indicator lamp 14 (serving as the self-driving indicator lamp 10) turn on continuously based on the selected lighting pattern.

At the step ST11, the self-driving/driving-assistance ECU 24 begins control to start the automobile 1 in the self-driving mode from the parked or stopped state. The self-driving/driving-assistance ECU 24 executes travel control in the self-driving mode such that the automobile 1 in the parked or stopped state travels along the path joining course. Accordingly, after the self-driving/driving-assistance ECU 24 has turned on the self-driving indicator lamp 10, the automobile 1 starts in the self-driving mode from the parked or stopped state.

Moreover, the self-driving/driving-assistance ECU 24 outputs an instruction of switching the lighting states of the lamps other than the self-driving indicator lamp 10, in accordance with a control of the automobile 1 being starting. For example, when the automobile 1 decelerates by applying braking force, the self-driving/driving-assistance ECU 24 outputs the instruction of turning on the stop lamps 73, to the lamp ECU 29. Accordingly, the stop lamps 73 turn on during the braking. Moreover, when the automobile 1 travels backward, the self-driving/driving-assistance ECU 24 outputs the instruction of turning on the backup lamps 74, to the lamp ECU 29. Accordingly, the backup lamps 74 turn on during the traveling backward. Moreover, when the automobile 1 is steered, the self-driving/driving-assistance ECU 24 outputs the instruction of turning on the direction-indicator lamps 72, to the lamp ECU 29. Accordingly, the direction-indicator lamps 72 at the steering side turn on during the steering. Accordingly, after the self-driving indicator lamp 10 begins turning on, the self-driving/driving-assistance ECU 24 controls turning-on of the lamps other than the self-driving indicator lamp 10. Until the other lamps turn on, the self-driving indicator lamp 10 turns on.

At a step ST12, the self-driving/driving-assistance ECU 24 determines whether the automatic starting mode ends. The self-driving/driving-assistance ECU 24 determine that the automobile 1 can travel normally in the self-driving mode, for example, (i) in a case where the travel control on the path joining course has been completed, (ii) in a case where the vehicle speed detected by the speed sensor 51 has exceeded a threshold, (iii) in a case where an elapsed time from when the automobile 1 began starting reaches a threshold or more, (iv) in a case where the automobile 1 begins traveling along a lane of the path, and (v) in a case where the direction-indicator lamps 72 that turned on when the automobile 1 started turn off. In these cases, the self-driving/driving-assistance ECU 24 determines that the automatic starting mode ends, and causes the processing to proceed to the step ST13. If the self-driving/driving-assistance ECU 24 does not determine that the automatic starting mode ends, the self-driving/driving-assistance ECU 24 returns the processing to the step ST9. In this case, the self-driving/driving-assistance ECU 24 repeatedly executes the travel control of the automobile 1 based on the path joining course from the step ST9 to the step ST12 until determining that the automatic starting mode ends.

At the step ST13, the self-driving/driving-assistance ECU 24 begins controlling the automobile 1 in the automatic path traveling mode. The traveling of the automobile 1 having already begun starting is switched from the automatic starting mode to the automatic path traveling mode.

At a step ST14, the self-driving/driving-assistance ECU 24 selects a lighting pattern in the automatic path traveling mode from the lighting pattern table 61 recorded in the memory 60, and instructs the lamp ECU 29 to begin turning on the self-driving indicator lamp 10 in accordance with the lighting pattern. The self-driving/driving-assistance ECU 24 selects the lighting pattern for automatic traveling at the third row in FIG. 5. In this case, the lamp ECU 29 switches all the lighting states of the plurality of indicator lamps 11 to 14. The front-right indicator lamp 11, the rear-right indicator lamp 12, the front-left indicator lamp 13, and the rear-left indicator lamp 14 turn on continuously and entirely. All the indicator lamps 11 to 14 that constitute the self-driving indicator lamp 10 are switched from the lighting states at the starting to the original lighting states when the automobile 1 is traveling in the self-driving mode.

At a step ST15, the self-driving/driving-assistance ECU 24 executes automatic travel control based on a path to a destination. The self-driving/driving-assistance ECU 24 may repeat determining a next course that is short in distance from the current location based on the path, for example, and controlling the traveling on the course.

At a step ST16, the self-driving/driving-assistance ECU 24 determines whether the self-driving mode ends. For example, (i) in a case where the automobile 1 has reached a destination that is the end of the path, (ii) in a case where the automobile 1 has been parked or stopped in or near the destination for a certain period of time, and (iii) in a case where the automobile 1 has been parked or stopped in or near the destination and the occupant 5 has gotten off the vehicle, the self-driving/driving-assistance ECU 24 determines that the self-driving mode ends, and causes the processing to proceed to a step ST17. In other cases, the self-driving/driving-assistance ECU 24 returns the processing to the step ST15. Accordingly, the automobile 1 travels along the lane of the path, and moves to the destination and is parked or stopped.

At a step ST17, the self-driving/driving-assistance ECU 24 executes final parking or stop control for the automobile 1 that is parked or stopped in or near the destination. The self-driving/driving-assistance ECU 24 causes the automobile 1 to travel in the self-driving mode to a parking space of a vacant parking lot, for example, and to park or stop. The self-driving/driving-assistance ECU 24 stops power feeding to the control ECUs, such as the drive ECU 21, the steering ECU 22, and the braking ECU 23, that are used for the traveling of the automobile 1, and power feeding to the respective elements that are used for traveling of the automobile 1. Accordingly, the automobile 1 enters a state in which the automobile 1 is completely parked or stopped and cannot begin travelling in the self-driving mode immediately.

At a step ST18, the self-driving/driving-assistance ECU 24 instructs the lamp ECU 29 to turn off. The lamp ECU 29 turn off all the plurality of indicator lamps 11 to 14. All of the front-right indicator lamp 11, the rear-right indicator lamp 12, the front-left indicator lamp 13, and the rear-left indicator lamp 14 turn off.

Figure 7A:
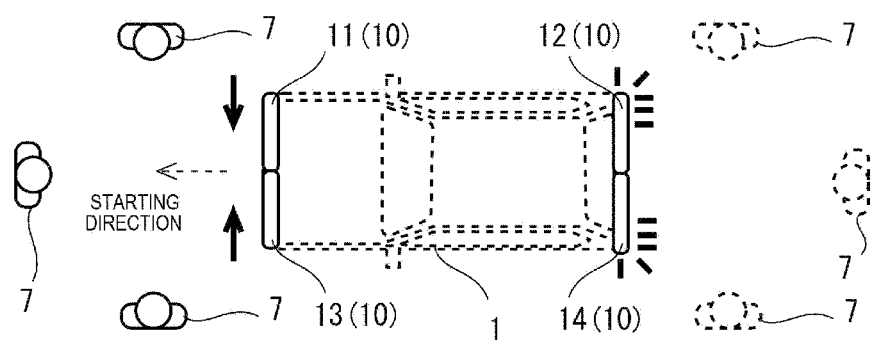
FIGS. 7A and 7B are diagrams illustrating examples of lighting states of the self-driving indicator lamp based on the lighting pattern table in FIG. 5, in accordance with starting directions.
Figure 7B:
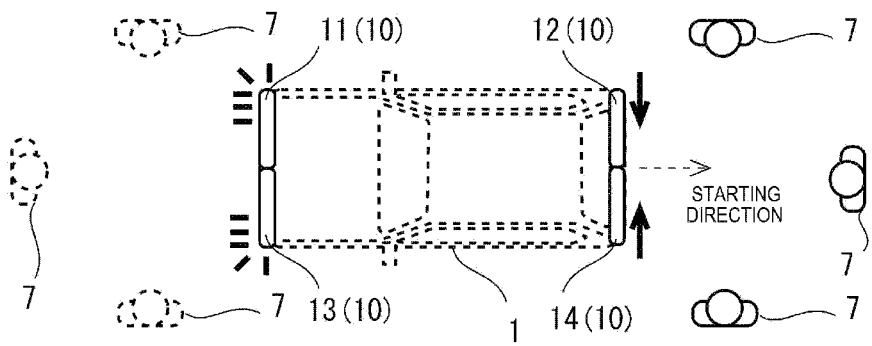

FIGS. 7A and 7B are diagrams illustrating examples of the lighting states of the self-driving indicator lamp 10 based on the lighting pattern table 61 in FIG. 5, in accordance with the starting direction.

FIG. 7A illustrates the lighting state of the self-driving indicator lamp 10 based on the lighting pattern at the first row in FIG. 5 when the automobile 1 starts frontward.

In this case, the front-right indicator lamp 11 and the front-left indicator lamp 13 (serving as the self-driving indicator lamp 10) turn on so as to change the lighting states of the front-right indicator lamp 11 and the front-left indicator lamp 13 from both side surfaces of the automobile 1 toward the center thereof. When the automobile 1 starts in the self-driving mode from the parked or stopped state, the lighting states of the front-right indicator lamp 11 and the front-left indicator lamp (serving as the self-driving indicator lamp 10) which have turned off during when the automobile 1 has been parked or stopped change to flash symmetrically about the center of the automobile 1 in the automobile width direction such that lighting zones in which the light emitting units 18 turn on respectively flow from the left and right sides of the automobile 1 toward the center of the automobile 1, which indicates the frontward starting direction. This enables the pedestrians 7 of solid line who are present in front of the automobile 1 to intuitively know that the automobile 1 not only intends to start in the self-driving mode but also intends to start toward the directions of the pedestrians 7 themselves from the lighting states of the front-right indicator lamp 11 and the front-left indicator lamp 13.

Moreover, the rear-right indicator lamp 12 and the rear-left indicator lamp 14 (serving as the self-driving indicator lamp 10) continuously and entirely turn on in a similar manner to when the automobile 1 is traveling in the self-driving mode. This enables the pedestrians 7 of broken line who are present in rear of the automobile 1 to intuitively know that the automobile 1 intends to starts in the self-driving mode from a continuous turn-on state in which the rear-right indicator lamp 12 and the rear-left indicator lamp 14 (serving as the self-driving indicator lamp 10) on the rear side of the automobile 1 continuously turn on. Moreover, this enables the pedestrians 7 of broken line who are present in rear of the automobile 1 and have a knowledge that the automobile 1 that intends to start in the self-driving mode causes the self-driving indicator lamp 10 to continuously turn on in the opposite side of the starting direction to further know that the automobile 1 intends to start in the self-driving mode toward the direction opposite to the pedestrians 7 themselves.

FIG. 7B illustrates the lighting state of the self-driving indicator lamp 10 based on the lighting pattern at the second row in FIG. 5 when the automobile 1 starts rearward.

In this case, the rear-right indicator lamp 12 and the rear-left indicator lamp 14 (serving as the self-driving indicator lamp 10) turn on so as to change the lighting states of the rear-right indicator lamp 12 and the rear-left indicator lamp 14 from both side surfaces of the automobile 1 toward the center thereof. When the automobile 1 starts in the self-driving mode from the parked or stopped state, the lighting states of the rear-right indicator lamp 12 and the rear-left indicator lamp 14 (serving as the self-driving indicator lamp 10) which have turned off during when the automobile 1 has been parked or stopped change to flash symmetrically about the center of the automobile 1 in the automobile width direction such that lighting zones in which the light emitting units 18 turn on respectively flow from both the left and right sides of the automobile 1 toward the center of the automobile 1, which indicates the rearward starting direction. This enables the pedestrians 7 of solid line who are present in rear of the automobile 1 to intuitively know that the automobile 1 not only intends to start in the self-driving mode but also intends to start toward the directions of the pedestrians 7 themselves from the lighting states of the rear-right indicator lamp 12 and the rear-left indicator lamp 14.

Moreover, the front-right indicator lamp 11 and the front-left indicator lamp 13 (serving as the self-driving indicator lamp 10) turn on continuously and entirely in a similar manner to when the automobile 1 is traveling in the self-driving mode. This enables the pedestrians 7 of broken line who are present in front of the automobile 1 to intuitively know that the automobile 1 intends to start in the self-driving mode, from the fact that the front-right indicator lamp 11 and the front-left indicator lamp 13 (serving as the self-driving indicator lamp 10 on the front side of the automobile 1) turn on continuously. Moreover, this enables the pedestrians 7 of broken line who are present in front of the automobile 1 and have a knowledge that the automobile 1 that intends to start in the self-driving mode continuously turns on the self-driving indicator lamp 10 on the opposite side to the starting direction, to further know that the automobile 1 intends to start in the self-driving mode toward the direction opposite to the pedestrians 7 themselves.

In this manner, when the automobile 1 having turned off the self-driving indicator lamp 10 and having been parked or stopped starts in the self-driving mode, the self-driving indicator lamp 10 begins turning on in a different lighting state from the normal lighting state to enable persons present in the surrounding, for example, the pedestrian 7 and an occupant of the other automobile 6 to know that the automobile 1 being parked or stopped intends to start in the self-driving mode. Moreover, the pedestrian 7 and the occupant of the other automobile 6 can cope with the starting.

Moreover, the self-driving indicator lamp 10 turns on with the lighting pattern corresponding to a starting direction of the automobile 1 being parked or stopped so as to indicate the starting direction, so that a person in the surrounding who has visually recognized the turning-on is enabled to know the starting direction in the self-driving mode when the automobile 1 having been parked or stopped is about to start in the self-driving mode. Moreover, the person in the surrounding can cope with the starting.

As in the foregoing, in the present embodiment, the self-driving indicator lamp 10 includes the front-right indicator lamp 11, the rear-right indicator lamp 12, the front-left indicator lamp 13, and the rear-left indicator lamp 14 the lighting states of which can be controlled independently in the left and right parts of the automobile 1. The front-right indicator lamp 11 and the rear-right indicator lamp 12 are right indicator lamps. The front-left indicator lamp 13 and the rear-left indicator lamp 14 are left indicator lamps.

Further, when the automobile 1 starts in the self-driving mode from the parked or stopped state, the self-driving/driving-assistance ECU 24 (which may serve as a "controller" in one embodiment) changes the lighting states of the self-driving indicator lamp 10 which has turned off during when the automobile 1 has been parked or stopped symmetrically about the center of the automobile 1 in the automobile width direction so as to indicate a frontward or rearward starting direction. This enables the self-driving indicator lamp 10 to display a frontward or rearward starting direction. For example, when each of these indicator lamps 11 to 14 at the four corners that constitute the self-driving indicator lamp 10 can be controlled to turn on and turn off in units of lighting zones arranged in the automobile width direction as in the present embodiment, (i) one pair of the left and right indicator lamps in the front side or rear side of the automobile 1 are turned on to flash such that lighting zones in which the light-emitting units 18 turn on or turn off among the plurality of lighting zones flow toward the center of the automobile 1 in opposite directions, or (ii) the plurality of lighting zones in each indicator lamps are turned on or turned off in sequence such that indication regions are turned on to change to be long and short toward the center of the automobile 1 in the opposite directions. Thereby, it is possible to change the lighting states of the plurality of indicator lamps 11 to 14 symmetrically about the center of the automobile 1 in the automobile width direction for each set of front and rear sides so as to indicate a frontward or rearward starting direction.

Accordingly, when the automobile 1 capable of operating in the self-driving mode having been parked or stopped and having turned off the self-driving indicator lamp 10 intends to start, a person who is present in the surrounding of the automobile 1 can visually recognize that the right indicator lamp and the left indicator lamp (serving as the self-driving indicator lamp 10) that are provided in the left and right parts of the automobile 1 are changed from the turning-off state during when the automobile 1 is parked or stopped. The person who is present in the surrounding of the automobile 1 can recognize that the automobile 1 capable of operating in the self-driving mode having been parked or stopped and having turned off the self-driving indicator lamp 10 intends to start.

In addition, in the present embodiment, the right indicator lamp and the left indicator lamp, which turn on in the self-driving mode and serve as the self-driving indicator lamp 10, not only turn on but also change symmetrically about the center of the automobile in the automobile width direction so as to indicate a frontward starting direction or a rearward starting direction. Since the lighting states of the right indicator lamp and the left indicator lamp (serving as the self-driving indicator lamp 10) change to turn on in such a manner, the person who is present in the surrounding of the automobile 1 is enabled to know whether the automobile 1 capable of operating in the self-driving mode intends to start in a frontward direction or a rearward direction, which is a lighting change direction, by visual recognition.

As a result, when the automobile 1 capable of operating in the self-driving mode having been parked or stopped with the self-driving indicator lamp 10 turning off starts, a person who is present in the surrounding of the automobile 1 can know a starting direction of the automobile 1 and excellently cope with the starting.

In addition, in the present embodiment, the lighting state of the direction-indicator lamps 72, for example, other than the self-driving indicator lamp 10, is not changed, but the lighting state of the self-driving indicator lamp 10 itself to turn on in the self-driving mode is changed. This can prevents, for example, such a phenomenon that when lighting of the self-driving indicator lamp 10 and lighting of another lamp adjacent to the self-driving indicator lamp 10 are controlled simultaneously in the automobile 1 that starts in the self-driving mode, colors of the lamps is visually recognized as a mixed color. This can prevent the visual recognition of the color of the light emitted from the self-driving indicator lamp 10 from becoming difficult. For example, when the plurality of indicator lamps 11 to 14 that constitute the self-driving indicator lamp 10 are provided along the outer peripheral surface in the lower part of the automobile 1, the stop lamps 73, the direction-indicator lamps 72, the backup lamps 74, and the headlamps 71 can be disposed near the self-driving indicator lamp 10. When the self-driving indicator lamp 10 and the stop lamp 73 simultaneously turn on, these colors are mixed and difficult to be visually recognized. When another lamp turns on after the self-driving indicator lamp 10 has stated turning on, it can be considered that the light emitting color of the self-driving indicator lamp 10 is temporarily visually recognized, so that it is possible to prevent the visual recognition of the light emitting color of the self-driving indicator lamp 10 from becoming difficult.

As in the foregoing, in the present embodiment, it is possible to suitably inform the person who is present in the surrounding of the automobile 1, while reducing electric power consumed by the self-driving indicator lamp 10, not only that the automobile 1 starts from the parked or stopped state, but also the starting direction.

Second Embodiment

Next, the automobile 1 capable of operating in the self-driving mode according to a second embodiment of the disclosure will be described. The following description will focus on differences from the above-described embodiment. The same reference numerals are used for the similar components to those in the above-described embodiment, and explanation thereof are omitted.

FIGS. 8A and 8B are diagrams illustrating arrangement of the self-driving indicator lamp 10, the lighting state of the self-driving indicator lamp 10, and the lighting pattern table 61 according to the second embodiment of the disclosure.

As illustrated in FIG. 8A, the front-right indicator lamp (serving as the self-driving indicator lamp 10) extends rearward from the front-right corner of the automobile 1. The front-right indicator lamp 11 extends from the front surface to the right side surface of the automobile 1. Further, ones of the plurality of light emitting units 18 are aligned along the front and rearward direction on the right side surface of the automobile 1.

The front-left indicator lamp 13 (serving as the self-driving indicator lamp 10) extends rearward from the front-left corner of the automobile 1. The front-left indicator lamp 13 extends from the front surface to the left side surface of the automobile 1. Further, ones of the plurality of light emitting units 18 are aligned along the front and rearward direction on the left side surface of the automobile 1.

The rear-right indicator lamp 12 (serving as the self-driving indicator lamp 10) extends frontward from the rear-right corner of the automobile 1. The rear-right indicator lamp 12 extends from the rear surface to the right side surface of the automobile 1. Further, ones of the plurality of light emitting units 18 are aligned along the front and rearward direction on the right side surface of the automobile 1.

The rear-left indicator lamp 14 (serving as the self-driving indicator lamp 10) extends frontward from the rear-left corner of the automobile 1. The rear-left indicator lamp 14 extends from the rear surface to the left side surface of the automobile 1. Further, ones of the plurality of light emitting units 18 are aligned along the front and rearward direction on the left side surface of the automobile 1.

In this manner, the front-right indicator lamp 11, the front-left indicator lamp 13, the rear-right indicator lamp 12, and the rear-left indicator lamp 14 wrap around from the front surface or the rear surface to both left and right side surfaces of the automobile 1. The front-right indicator lamp 11 and the rear-right indicator lamp 12 can be visually recognize from the right side of the automobile 1. The front-left indicator lamp 13 and the rear-left indicator lamp 14 can be visually recognize from the left side of the automobile 1.

FIG. 8B is a diagram illustrating the lighting pattern table 61 for the self-driving indicator lamp 10 that is recorded in the memory 60 in FIG. 2.

The respective lighting states of the front-right indicator lamp 11, the rear-right indicator lamp 12, the front-left indicator lamp 13, and the rear-left indicator lamp 14 are controlled in accordance with the lighting pattern table 61.

Data on the lighting pattern at a first row in FIG. 8B is used when the automobile 1 starts frontward in the self-driving mode. The lighting state of the rear-left indicator lamp 14 and the lighting state of the rear-right indicator lamp 12 are different from those in FIG. 5. The rear-left indicator lamp 14 is controlled to be in the left flash state. The rear-right indicator lamp 12 is controlled to be in the right flash state. The rear-left indicator lamp 14 and the rear-right indicator lamp 12 wrap around from the rear surface to both left and right side surfaces of the automobile 1, and thus can be visually recognized in the lighting states thereof such that the rear-left indicator lamp 14 and the rear-right indicator lamp 12 turn on toward the front in sequence. As illustrated in FIG. 8A, the rear-left indicator lamp 14 and the rear-right indicator lamp 12 enter a lighting state in which the light emitting units 18 turn on from the center of the automobile 1 toward both side surfaces of the automobile 1 in sequence, and in a front flash state.

Data on the lighting pattern at a second row in FIG. 8B is used when the automobile 1 starts rearward in the self-driving mode. The lighting state of the front-left indicator lamp 13 and the lighting state of the front-right indicator lamp 11 are different from those in FIG. 5. The front-left indicator lamp 13 is controlled to be in the left flash state. The front-right indicator lamp 11 is controlled to be in the right flash state. The front-left indicator lamp 13 and the front-right indicator lamp 11 wrap around from the front surface to both left and right side surfaces of the automobile 1, and thus can be visually recognized in the lighting states thereof such that the front-left indicator lamp 13 and the front-right indicator lamp 11 turn on toward the rear in sequence. The front-left indicator lamp 13 and the front-right indicator lamp 11 enter a lighting state in which the light emitting units 18 turn on from the center of the automobile 1 toward the side surfaces of the automobile 1 in sequence, and in a rear flash state.

The front-right indicator lamp 11, the front-left indicator lamp 13, the rear-right indicator lamp 12, and the rear-left indicator lamp 14 are controlled to be in such lighting states, so that the present embodiment exhibits an effect similar to that in the above-described embodiment. In addition, as illustrated in FIG. 8A, persons who are present in the surrounding in rear of and left or right to the automobile 1 can know whether the automobile 1 capable of operating in the self-driving mode intends to start in a frontward direction or a rearward direction, which is a lighting change direction, by visual recognition.

The embodiment in the foregoing is an example of the disclosure. It is noted that the disclosure is not limited to the embodiment. Various modifications and changes may be made to the embodiments without departing from the sprit and scope of the disclosure.

The invention claimed is:

1. A vehicle capable of operating in a self-driving mode, the vehicle comprising:
 a self-driving indicator lamp that can turn on so as to be visually recognized from an outside of the vehicle in the self-driving mode; and
 a controller configured to control a lighting state of the self-driving indicator lamp, wherein
 the self-driving indicator lamp comprises a right indicator lamp and a left indicator lamp respectively disposed in a right part and a left part of the vehicle,
 lighting states of the right indicator lamp and the left indicator lamp can be controlled independently, and
 when the vehicle starts to move in the self-driving mode from a parked or stopped state, the controller changes the lighting states of the right indicator lamp and the left indicator lamp, which have turned off during when the vehicle has been parked or stopped, in a manner similar to each other so as to indicate a frontward or rearward starting direction.

2. The vehicle capable of operating in the self-driving mode according to claim 1, wherein
 the self-driving indicator lamp comprises a plurality of indicator lamps comprising the right indicator lamp and the left indicator lamp, and
 the plurality of indicator lamps are provided along an outer peripheral surface of the vehicle.

3. The vehicle capable of operating in the self-driving mode according to claim 1, wherein
 each indicator lamp can be controlled to turn on for each of multiple lighting zones that are set in a vehicle width direction, and
 each indicator lamp can be controlled to turn on and turn off in units of the lighting zones.

4. The vehicle capable of operating in the self-driving mode according to claim 2, wherein
 each indicator lamp can be controlled to turn on for each of multiple lighting zones that are set in a vehicle width direction, and
 each indicator lamp can be controlled to turn on and turn off in units of the lighting zones.

5. The vehicle capable of operating in the self-driving mode according to claim 1, wherein
 the right indicator lamp comprises a front-right indicator lamp and a rear-right indicator lamp, and
 the left indicator lamp comprises a front-left indicator lamp and a rear-left indicator lamp.

6. The vehicle capable of operating in the self-driving mode according to claim 2, wherein
 the right indicator lamp comprises a front-right indicator lamp and a rear-right indicator lamp, and
 the left indicator lamp comprises a front-left indicator lamp and a rear-left indicator lamp.

7. The vehicle capable of operating in the self-driving mode according to claim 5, wherein
 when the vehicle starts frontward in the self-driving mode from the parked or stopped state, the controller
 turns on the front-right indicator lamp and the front-left indicator lamp so as to change lighting states of the front-right indicator lamp and the front-left indicator lamp from both side surfaces of the vehicle toward a center of the vehicle, and
 turns on the rear-right indicator lamp and the rear-left indicator lamp such that lighting states of the rear-right indicator lamp and the rear-left indicator lamp are identical to those when the vehicle is traveling in the self-driving mode, and when the vehicle starts rearward in the self-driving mode from the parked or stopped state, the controller turns on the rear-right indicator lamp and the rear-left indicator lamp so as to change the lighting states of the rear-right indicator lamp and the rear-left indicator lamp from both side surfaces of the vehicle toward the center of the vehicle, and turns on the front-right indicator lamp and the front-left indicator lamp such that the lighting states of the front-right indicator lamp and the front-left indicator lamp are identical to those when the vehicle is traveling in the self-driving mode.

8. The vehicle capable of operating in the self-driving mode according to claim 6, wherein when the vehicle starts frontward in the self-driving mode from the parked or stopped state, the controller turns on the front-right indicator lamp and the front-left indicator lamp so as to change lighting states of the front-right indicator lamp and the front-left indicator lamp from both side surfaces of the vehicle toward a center of the vehicle, and turns on the rear-right indicator lamp and the rear-left indicator lamp such that lighting states of the rear-right indicator lamp and the rear-left indicator lamp are identical to those when the vehicle is traveling in the self-driving mode, and when the vehicle starts rearward in the self-driving mode from the parked or stopped state, the controller turns on the rear-right indicator lamp and the rear-left indicator lamp so as to change the lighting states of the rear-right indicator lamp and the rear-left indicator lamp from both side surfaces of the vehicle toward the center of the vehicle, and turns on the front-right indicator lamp and the front-left indicator lamp such that the lighting states of the front-right indicator lamp and the front-left indicator lamp are identical to those when the vehicle is traveling in the self-driving mode.

9. The vehicle capable of operating in the self-driving mode according to claim 5, wherein when the vehicle starts frontward in the self-driving mode from the parked or stopped state, the controller turns on the front-right indicator lamp and the front-left indicator lamp so as to change lighting states of the front-right indicator lamp and the front-left indicator lamp from both side surfaces of the vehicle toward a center of the vehicle, and turns on the rear-right indicator lamp and the rear-left indicator lamp so as to change lighting states of the rear-right indicator lamp and the rear-left indicator lamp from the center of the vehicle toward both side surfaces of the vehicle, and when the vehicle starts rearward in the self-driving mode from the parked or stopped state, the controller turns on the rear-right indicator lamp and the rear-left indicator lamp so as to change the lighting states of the rear-right indicator lamp and the rear-left indicator lamp from both side surfaces of the vehicle toward the center of the vehicle, and turns on the front-right indicator lamp and the front-left indicator lamp so as to change the lighting states of the front-right indicator lamp and the front-left indicator lamp from the center of the vehicle toward both side surfaces of the vehicle.

10. The vehicle capable of operating in the self-driving mode according to claim 6, wherein when the vehicle starts frontward in the self-driving mode from the parked or stopped state, the controller turns on the front-right indicator lamp and the front-left indicator lamp so as to change lighting states of the front-right indicator lamp and the front-left indicator lamp from both side surfaces of the vehicle toward a center of the vehicle, and turns on the rear-right indicator lamp and the rear-left indicator lamp so as to change lighting states of the rear-right indicator lamp and the rear-left indicator lamp from the center of the vehicle toward both side surfaces of the vehicle, and when the vehicle starts rearward in the self-driving mode from the parked or stopped state, the controller turns on the rear-right indicator lamp and the rear-left indicator lamp so as to change the lighting states of the rear-right indicator lamp and the rear-left indicator lamp from both side surfaces of the vehicle toward the center of the vehicle, and turns on the front-right indicator lamp and the front-left indicator lamp so as to change the lighting states of the front-right indicator lamp and the front-left indicator lamp from the center of the vehicle toward both side surfaces of the vehicle.

11. The vehicle capable of operating in the self-driving mode according to claim 1, wherein when the vehicle having started in the self-driving mode enters a normal traveling state in the self-driving mode, the controller switches all indicator lamps that constitute the self-driving indicator lamp from lighting states at the starting to lighting states when the vehicle is traveling in the self-driving mode.

12. The vehicle capable of operating in the self-driving mode according to claim 2, wherein when the vehicle having started in the self-driving mode enters a normal traveling state in the self-driving mode, the controller switches all indicator lamps that constitute the self-driving indicator lamp from lighting states at the starting to lighting states when the vehicle is traveling in the self-driving mode.

13. The vehicle capable of operating in the self-driving mode according to claim 11, wherein the controller determines that the vehicle having started in the self-driving mode enters the normal traveling state in the self-driving mode (i) when a vehicle speed of the vehicle is a threshold or more, (ii) when an elapsed time from when the vehicle began starting is a threshold or more, (iii) when the vehicle begins traveling along a lane, or (iv) when a direction-indicator lamp that is provided in the vehicle turns off.

14. The vehicle capable of operating in the self-driving mode according to claim 12, wherein the controller determines that the vehicle having started in the self-driving mode enters the normal traveling state in the self-driving mode (i) when a vehicle speed of the vehicle is a threshold or more, (ii) when an elapsed time from when the vehicle began starting is a threshold or more, (iii) when the vehicle begins traveling along a lane, or (iv) when a direction-indicator lamp that is provided in the vehicle turns off.

15. The vehicle capable of operating in the self-driving mode according to claim 1, the vehicle further comprising:

a memory configured to store a plurality of lighting patterns with respect to a plurality of starting directions, as lighting patterns for the self-driving indicator lamp that is used in controlling turning on and turning off of the self-driving indicator lamp when the vehicle starts in the self-driving mode, wherein when the vehicle begins operating in the self-driving mode, the controller selects one lighting pattern from the memory based on a starting direction of the vehicle in the self-driving mode, controls the lighting state of the self-driving indicator lamp that turns on in the self-driving mode on a basis of the selected lighting pattern, and thereafter begins a control to cause the vehicle to start in the self-driving mode from the parked or stopped state.

16. The vehicle capable of operating in the self-driving mode according to claim 2, the vehicle further comprising:

a memory configured to store a plurality of lighting patterns with respect to a plurality of starting directions, as lighting patterns for the self-driving indicator lamp that is used in controlling turning on and turning off of the self-driving indicator lamp when the vehicle starts in the self-driving mode, wherein when the vehicle begins operating in the self-driving mode, the controller selects one lighting pattern from the memory based on a starting direction of the vehicle in the self-driving mode, controls the lighting state of the self-driving indicator lamp that turns on in the self-driving mode on a basis of the selected lighting pattern, and thereafter begins a control to cause the vehicle to start in the self-driving mode from the parked or stopped state.

\* \* \* \* \*